US010280972B2

(12) United States Patent
Luo

(10) Patent No.: US 10,280,972 B2
(45) Date of Patent: May 7, 2019

(54) GROOVE-TYPE DYNAMIC PRESSURE GAS RADIAL BEARING

(71) Applicant: Lifeng Luo, Shanghai (CN)

(72) Inventor: Lifeng Luo, Shanghai (CN)

( * ) Notice: Subject to any disclaimer, the term of this patent is extended or adjusted under 35 U.S.C. 154(b) by 0 days.

(21) Appl. No.: 15/575,632

(22) PCT Filed: May 19, 2015

(86) PCT No.: PCT/CN2015/079233
§ 371 (c)(1),
(2) Date: Nov. 20, 2017

(87) PCT Pub. No.: WO2016/183787
PCT Pub. Date: Nov. 24, 2016

(65) Prior Publication Data
US 2018/0119738 A1 May 3, 2018

(51) Int. Cl.
*F16C 17/10* (2006.01)
*F16C 32/06* (2006.01)
*F16C 17/02* (2006.01)

(52) U.S. Cl.
CPC .......... *F16C 17/107* (2013.01); *F16C 17/026* (2013.01); *F16C 17/028* (2013.01); *F16C 32/06* (2013.01)

(58) Field of Classification Search
CPC .... F16C 17/028; F16C 17/045; F16C 17/047; F16C 17/102; F16C 17/107; F16C 33/06; F16C 33/0659; F16C 33/0685; F16C 33/0692; F16C 33/0696; F16C 17/026
See application file for complete search history.

(56) References Cited

U.S. PATENT DOCUMENTS 6,354,742 B1    3/2002  Iwaki et al.
7,296,931 B2 *  11/2007 Kurimura ............. F16C 17/026
                                                    384/107

(Continued)

FOREIGN PATENT DOCUMENTS

CN            102242762       11/2011

OTHER PUBLICATIONS

International Search Report, International Application No. PCT/CN2015/079233, dated Jan. 19, 2016, 2 pages.

*Primary Examiner* — James Pilkington
(74) *Attorney, Agent, or Firm* — Ware, Fressola, Maguire & Barber LLP

(57) ABSTRACT

A groove-type dynamic pressure gas radial bearing, comprises a bearing outer sleeve and a bearing inner sleeve, the outer circumferential face and the two end faces of the bearing inner sleeve are respectively provided with regular groove-type patterns, and the groove-type pattern in one end face is in mirror symmetry with the groove-type pattern in the other end face, and the axial contour lines of the groove-type patterns in the outer circumferential face and the radial contour lines of the groove-type patterns in the left and right end faces are in one-to-one correspondence and are connected with each other. The groove-type dynamic pressure gas radial bearing provided by the invention can achieve a load capacity of 1-3 kg and a limit rotating speed of 200,000 rpm to 450,000 rpm, it can realize the application of groove-type dynamic pressure gas radial bearings in ultra high-speed areas.

5 Claims, 3 Drawing Sheets

(56) References Cited

U.S. PATENT DOCUMENTS 8,240,917 B2 * 8/2012 Engesser ............... F16C 17/045
384/100
2002/0164096 A1 11/2002 Kashiwada et al.
2006/0210205 A1 9/2006 Engesser et al.

* cited by examiner

GROOVE-TYPE DYNAMIC PRESSURE GAS RADIAL BEARING

TECHNICAL FIELD

The invention relates to a dynamic pressure gas radial bearing, in particular to a groove-type dynamic pressure gas radial bearing, belongs to the technical field of gas bearings.

BACKGROUND

The gas bearing has the advantages of being high in speed, high in precision, resistant to high temperature and small in friction loss, long in service life and the like. After the rapid development of recent decades, the gas bearing has been widely applied to the fields of high-speed supporting, high-precision supporting and the like. At present, various types of gas bearings have been developed, and the gas bearings are mainly divided into a dynamic pressure type and a static pressure type.

The dynamic pressure gas bearing takes gas as a lubricant, and a gas film is formed between the shaft and the bearing. It is a bearing form that the moving face is not in direct contact with the static face, and it has many advantages such as no pollution, low friction loss, wide temperature range, smooth operation, long use time and high working speed. Due to the small friction loss, and not necessary to use liquid lubricating oil, it is widely used in the field of high-speed rotary applications. In particular, it is often used in ultra-high-speed application field which is usually supported by a rolling bearing and where liquid lubricants are not suitable.

The dynamic pressure gas bearing in accordance with the direction of bearing load is divided into a dynamic pressure gas radial bearing, a dynamic pressure gas thrust bearing and a dynamic pressure radial thrust combined bearing. The dynamic pressure gas radial bearing is formed by the relatively moving two working faces forming a wedge-shaped space. When they are relatively moved, the gas is driven by its own viscous action and compressed into the wedge-shaped gap, thereby generating dynamic pressure to support the load. Different structural forms of gas dynamic pressure radial bearings due to structural differences, the work process is slightly different. At present, the more common types of dynamic pressure radial bearing structure are a tilting pad type, a groove type and a foil type.

The tilting pad type dynamic pressure gas radial bearing is a kind of excellent dynamic pressure gas bearing with self-adjusting performance, which can work safely in the space of smaller air gap, and is not sensitive to thermal deformation, elastic deformation and so on, and the machining precision is easy to be guaranteed, and it has the outstanding advantages of being capable of automatically tracking the change of the load. At present, it is mainly used in large-scale high-speed rotating machinery and turbine machinery at home and abroad. But its bearing structure is more complex, the installation process is complex, is higher than the general radial bearing requirements, thus its application is limited.

Although the foil type dynamic pressure radial bearing with elastic support, can make the bearing to obtain a certain bearing capacity and alleviate the impact vibration capacity, but the foil bearing is usually made of metal foil sheets, there are still some problems in the material manufacturing technology and processing technology, the damping value of the bearing can not be greatly improved, so that the rigidity of the bearing is not enough, the critical rotating speed of the bearing is low, and the bearing is easy to instability and even stuck during high-speed operation.

The groove type dynamic pressure gas radial bearing has good stability, and the certain stability is achieved even under no load; moreover, at a high speed, the static bearing capacity is larger than that of other forms of bearings. But the existing groove-type dynamic pressure gas radial bearing can only achieve the load capacity of 0.5-1.5 kg and can only reach the maximum limit rotating speed of 100,000 rpm-200,000 rpm, it can not meet the application of the ultra-high speed field under a large load.

SUMMARY

In view of the problems of the prior art discussed above, it is an object of the present invention to provide a groove-type dynamic pressure gas radial bearing, in order to achieve the application of dynamic pressure gas radial bearings in the ultra-high-speed areas under larger load.

To achieve the above object, the subject matter of the present invention is as follow:

A groove-type dynamic pressure gas radial bearing, comprises a bearing outer sleeve and a bearing inner sleeve, the outer circumferential face and the two end faces of the bearing inner sleeve are respectively provided with regular groove-type patterns, and the groove-type pattern in one end face is in mirror symmetry with the groove-type pattern in the other end face, and the axial contour lines of the groove-type patterns in the outer circumferential face and the radial contour lines of the groove-type patterns in the left and right end faces are in one-to-one correspondence and are connected with each other.

An implementation scheme, wherein the axial high-position lines of the groove-type patterns in the outer circumferential face of the bearing inner sleeve correspond to the radial high-position lines of the groove-type patterns in the left and right end faces, and are connected with each other in front of the circumferential chamfer in the end face; and the axial middle-position lines of the groove-type patterns in the outer circumferential face correspond to the radial middle-position lines of the groove-type patterns in the two end faces, and are connected with each other in front of the circumferential chamfer in the end face; and the axial low-position lines of the groove-type patterns in the outer circumferential face correspond to the radial low-position lines of the groove-type patterns in the two end faces, and are connected with each other in front of the circumferential chamfer in the end face.

An implementation scheme, the groove-type pattern is of an impeller shape.

As a preferable scheme, the matching clearance between the bearing outer sleeve and the bearing inner sleeve is 0.003-0.008 mm.

As a preferable scheme, stop rings are arranged at the two ends of a bearing outer sleeve.

As a preferable scheme, through holes and concave holes which are coaxial are formed in the outer circumference of the bearing outer sleeve, and the through holes are located in the concave holes in the same axis.

Compared to the prior art, the present invention offers the following benefits:

According to the invention, the outer circumferential face and the two end faces of the bearing inner sleeve are provided with regular groove-type patterns, and the groove-type pattern in one end face is in mirror symmetry with the groove-type pattern in the other end face, and the axial contour lines of the groove-type patterns in the outer circumferential face and the radial contour lines of the groove-type patterns in the two end faces are in one-to-one correspondence and are connected with each other, so that the pressurized air generated by the groove-type patterns in the left and right end faces is continuously conveyed from a center of the shaft along the radial direction into groove-type-like channels formed by the groove-type patterns in the outer circumferential face, and the required air film to provide a stronger support to the high-speed running bearing can be formed, and the air film serves as a lubricant for the dynamic pressure gas radial bearing, then the high-speed stable operation of the hybrid dynamic pressure gas radial bearing under the air floatation state can be ensured, and provides a further guarantee for achieving the high-limit rotating speed.

Through the test, the groove-type dynamic pressure gas radial bearing provided by the invention can achieve a load capacity of 1-3 kg and a limit rotating speed of 200,000 rpm to 450,000 rpm, but the existing groove-type dynamic pressure gas radial bearing can only achieve a load capacity of 0.5-1.5 kg and a limit rotating speed of 100,000 rpm to 200,000 rpm. It can be seen that the present invention can realize the application of groove-type dynamic pressure gas radial bearings in ultra high-speed areas. Compared with the prior art, the present invention has made significant progress.

Figure 1:
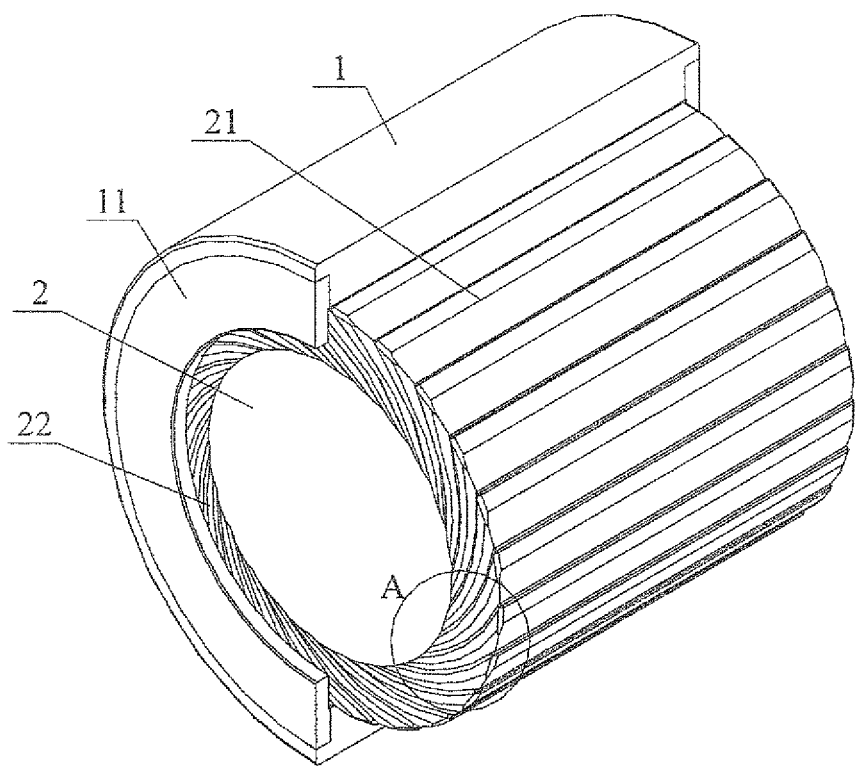
FIG. 1 is a schematic diagram of a left-view three-dimensional structure of partial segmentation of a groove-type dynamic pressure gas radial bearing according to the first embodiment of the present invention.
Figure 2:
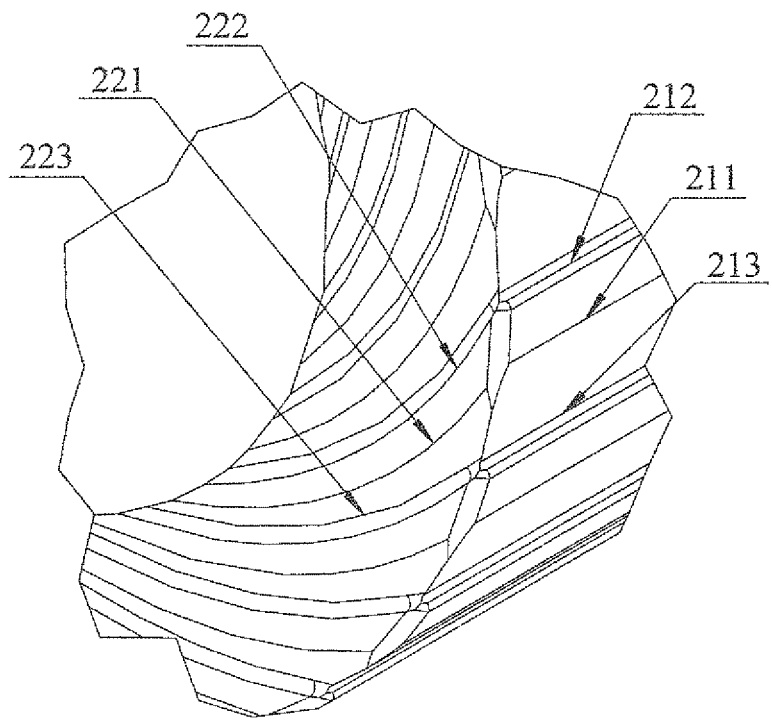
FIG. 2 is an enlarged view of the part A in FIG. 1.

Reference numerals in the figures denote as follows:

1, bearing outer sleeve; 11, stop ring; 12, through hole; 13, concave hole; 2, bearing inner sleeve; 21, groove-type pattern in the outer circumferential face; 211, axial high-position line; 212, axial middle-position line; 213, axial low-position line; 22, groove-type patterns in the left end face; 221, radial high-position line; 222, radial middle-position line; 223, radial low-position line; 23, groove-type pattern in the right end face; 231, radial high-position line; 232, radial middle-position line; 233, radial low-position line.

DETAILED DESCRIPTION

The subject matter of the present invention will be described in further detail below with reference to several embodiments and the accompanying drawings.

Example 1

Figure 3:
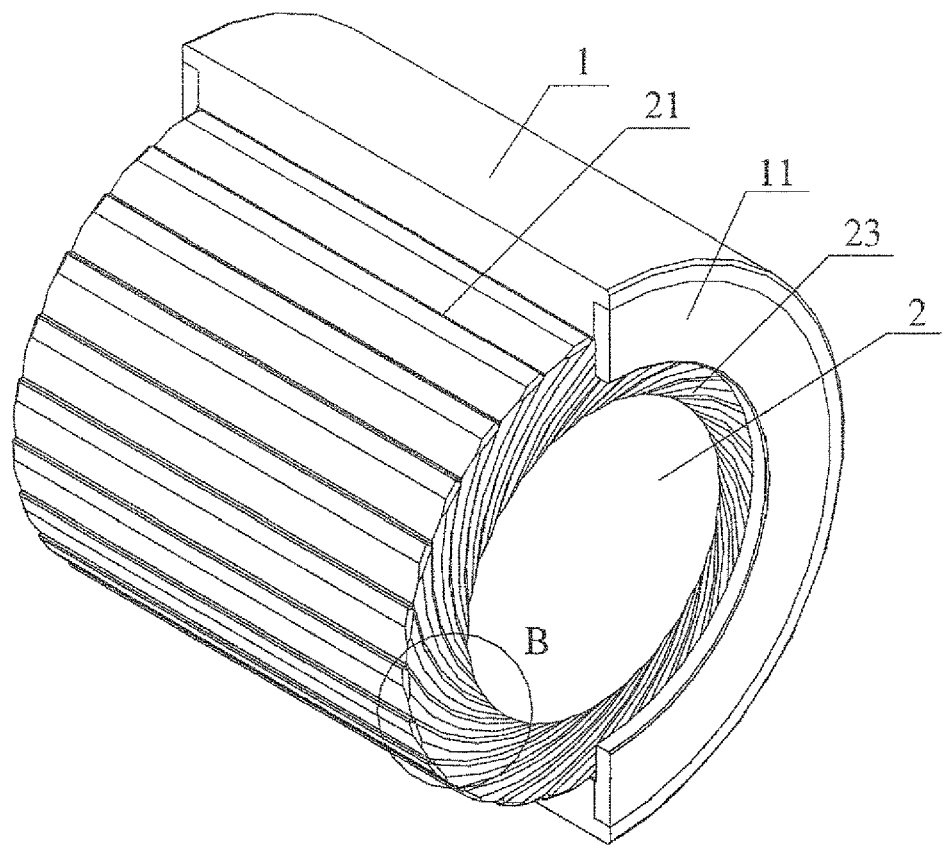
FIG. 3 is a schematic diagram of a right-view three-dimensional structure of partial segmentation of a groove-type dynamic pressure gas radial bearing according to the first embodiment of the present invention.
Figure 4:
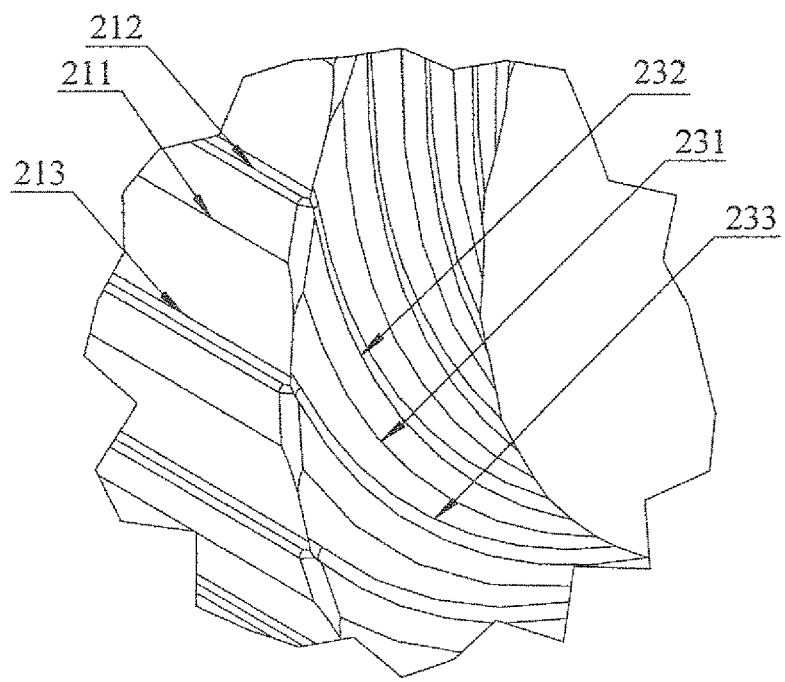
FIG. 4 is an enlarged view of the part B in FIG. 3.

As shown in FIG. 1 and FIG. 3, the groove-type dynamic pressure gas radial bearing provided by the embodiment of the invention, includes a bearing outer sleeve 1 and a bearing inner sleeve 2, wherein the outer circumferential face of the bearing inner sleeve 2 and the left end face and the right end face are respectively provided with regular groove-type patterns (21, 22 and 23 as shown in the figures, and the groove-type patterns in the embodiment are all in the shape of an impeller), and a mirror symmetry is formed between the groove-type pattern 22 in the left end face and the groove-type pattern 23 in the right end face.

With combined reference to FIGS. 1 to 4, the axial contour lines of the groove-type patterns 21 in the outer circumferential face of the bearing inner sleeve 2 are connected with the radial contour lines of the groove-type patterns 22 in the left end face and the groove-type patterns 23 in the right end face, and correspond to each other, that is, the axial high-position lines 211 of the groove-type patterns 21 in the outer circumferential face are connected with the radial high-position lines (221 and 231) of the groove-type patterns 22 in the left end face and the groove-type patterns 23 in the right end face in front of the peripheral chamfer in the end face, and correspond to each other; the axial middle-position lines 212 of the groove-type patterns 21 in the outer circumferential face are connected with the radial middle-position lines (222 and 232) of the groove-type patterns 22 in the left end face and the groove-type patterns 23 in the right end face in front of the peripheral chamfer in the end face, and correspond to each other; the axial low-position lines 213 of the groove-type patterns 21 in the outer circumferential face are connected with the radial low-position lines (223 and 233) of the groove-type patterns 22 in the left end face and the groove-type patterns 23 in the right end face in front of the peripheral chamfer in the end face, and correspond to each other.

By providing with the groove-type patterns (21, 22, 23) with regular shape in the outer circumferential face and the two end faces of the bearing inner sleeve 2, and forming a mirror symmetry between the groove-type pattern 22 in the left end face and the groove-type pattern 23 in the right end face, and forming one-to-one correspondence and are connected with each other between the axial contour lines of the groove-type patterns 21 in the outer circumferential face of the bearing inner sleeve 2 and the radial contour lines of the groove-type patterns 22 in the left end face and the groove-type patterns 23 in the right end face, which ensures the pressurized air generated by the groove-type patterns (22 and 23) resembling an impeller in the left and right end faces is continuously conveyed from a center of the shaft along the radial direction into groove-type-like channels formed by the groove-type patterns 21 in the outer circumferential face, and the required air film to provide a stronger support to the high-speed running bearing can be formed, and the air film serves as a lubricant for the dynamic pressure gas radial bearing, then the high-speed stable operation of the hybrid dynamic pressure gas radial bearing under the air floatation state can be ensured, and provides a further guarantee for achieving the high-limit rotating speed.

In addition, when the stop rings 11 are arranged at the two ends of the bearing outer sleeve 1 respectively, a self-sealing effect can be generated between the two end faces of the bearing inner sleeve 2 and the stop ring 11 driven by a high-speed rotating shaft, so that the dynamic pressure gas continuously generated by the groove type pattern can be completely and hermetically sealed in the whole matching clearance of the bearing, and the lubricating requirements of the high-speed running dynamic-pressure gas radial bearing can be fully guaranteed. The matching clearance between the bearing outer sleeve 1 and the bearing inner sleeve 2 is preferably 0.003-0.008 mm, so that the reliability and the stability of high-speed operation of the bearing can be further ensured.

Example 2

Figure 5:
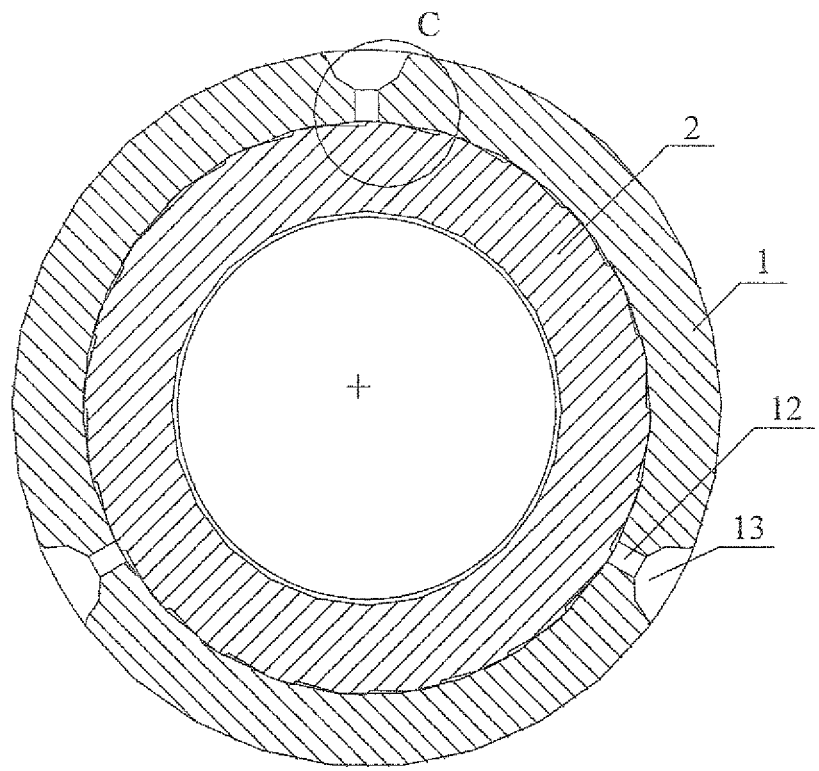
FIG. 5 is a schematic cross-sectional view of a groove-type dynamic pressure gas radial bearing according to embodiment 2 of the present invention.
Figure 6:
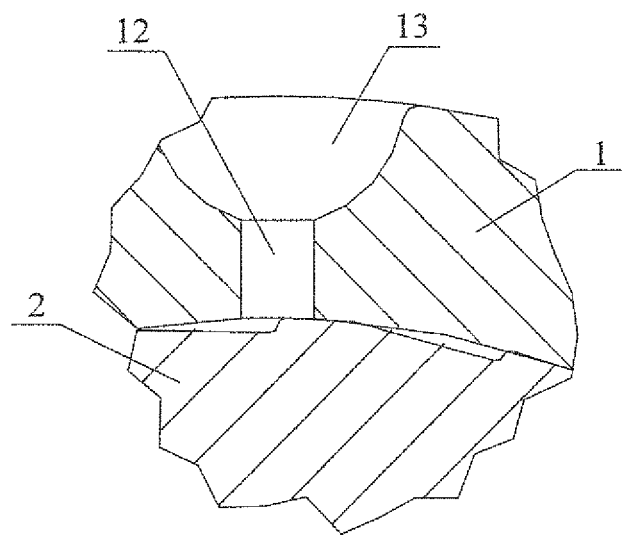
FIG. 6 is an enlarged view of the part C in FIG. 5.

As shown in FIG. 5 and FIG. 6, the only difference from the groove-type dynamic pressure gas radial bearing in the first embodiment is that coaxial through holes 12 and a concave holes 13 are formed in the outer circumference of the bearing outer sleeve 1, and the through hole 12 is located in the concave hole 13. The through holes 12 and the concave holes 13 are used for conveniently monitoring the running state of the bearing on line (for example: a temperature sensor, a pressure sensor, a rotating speed sensor and the like).

Test results show that the groove-type dynamic pressure gas radial bearing provided by the invention can achieve a load capacity of 1-3 kg and a limit rotating speed of 200,000 rpm to 450,000 rpm, but the existing groove-type dynamic pressure gas radial bearing can only achieve a load capacity of 0.5-1.5 kg and a limit rotating speed of 100,000 rpm to 200,000 rpm. It can be seen that the present invention can realize the application of groove-type dynamic pressure gas radial bearings in ultra high-speed areas. Compared with the prior art, the present invention has made significant progress.

At last, it is noted here that the above disclosure is intended merely to describe the subject matter of the present invention in further detail and is not to be construed as limiting the scope of the invention. Non-substantive improvements and modifications made by those skilled in the art in accordance with the above disclosure all fall within the scope of the present invention.

The invention claimed is:

1. A groove-type dynamic pressure gas radial bearing, comprising a bearing outer sleeve and a bearing inner sleeve, the bearing inner sleeve having an outer circumferential face and two end faces, wherein the circumferential face and the two end faces of the bearing inner sleeve are each provided with a groove-type pattern, the groove-type pattern on the outer circumferential face comprising a plurality of axial contour lines, the groove-type pattern on each of the end faces comprising a plurality of curved radial contour lines, and wherein the groove-type pattern on one end face is in mirror symmetry with the groove-type pattern on the other end face, and the axial contour lines of the groove-type pattern on the outer circumferential face and the curved radial contour lines of the groove-type pattern on each of end faces are in one-to-one correspondence and are connected with each other.

2. The groove-type dynamic pressure gas radial bearing according to claim 1, wherein a clearance between the bearing outer sleeve and the bearing inner sleeve is 0.003-0.008 mm.

3. The groove-type dynamic pressure gas radial bearing according to claim 1, wherein stop rings are arranged at two ends of the bearing outer sleeve.

4. The groove-type dynamic pressure gas radial bearing according to claim 1, wherein through holes and concave holes which are coaxial are formed in the outer circumference of the bearing outer sleeve.

5. The groove-type dynamic pressure gas radial bearing according to claim 4, wherein the through holes are located in the concave holes on a same axis.

* * * * *